May 21, 1940.    J. M. BRUCE    2,201,154
BREW HANDLING AND DISPENSING APPARATUS
Filed Nov. 8, 1937    2 Sheets-Sheet 2
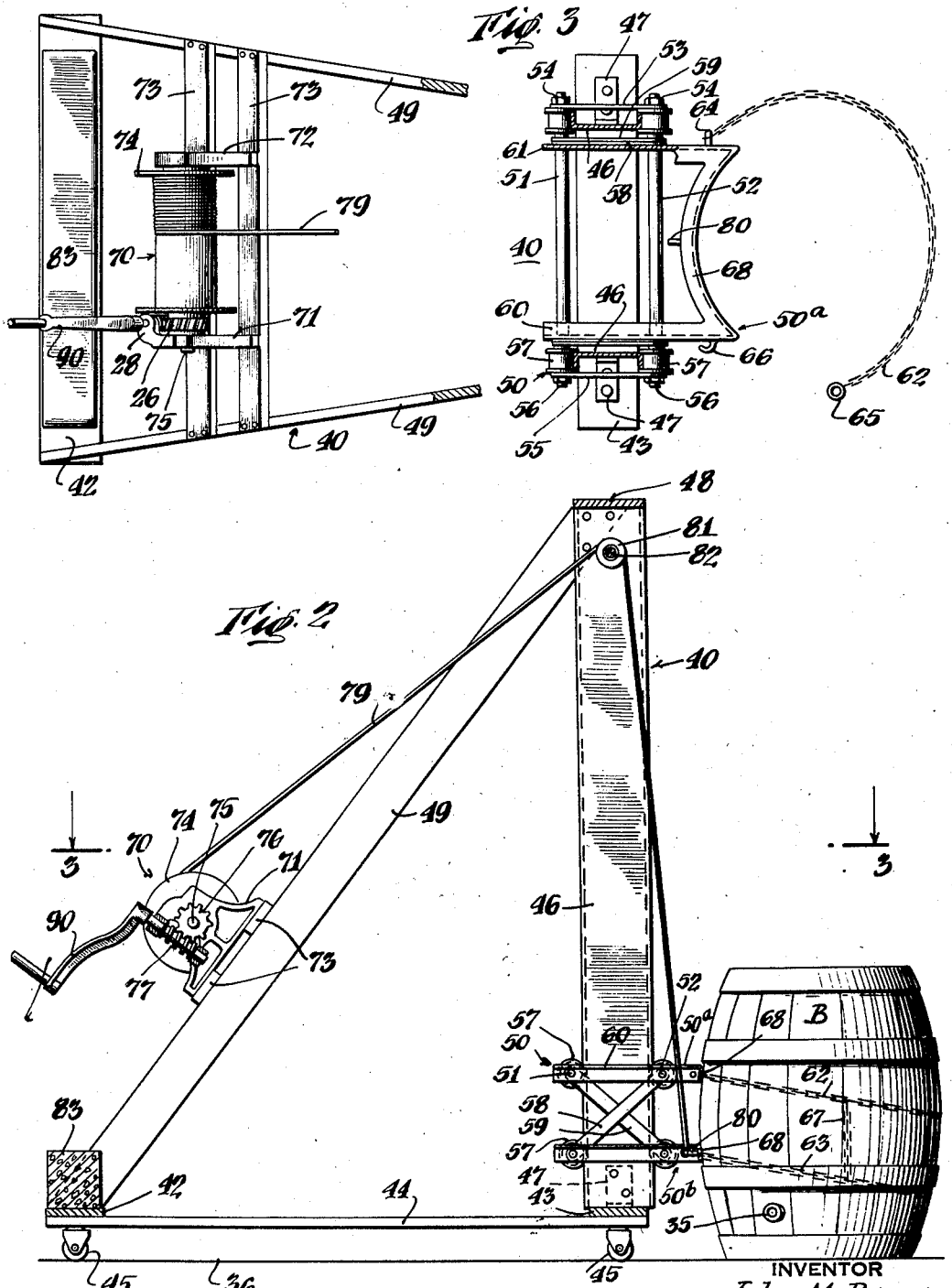
INVENTOR
John M. Bruce
BY Albert M. Austin
ATTORNEY Patented May 21, 1940

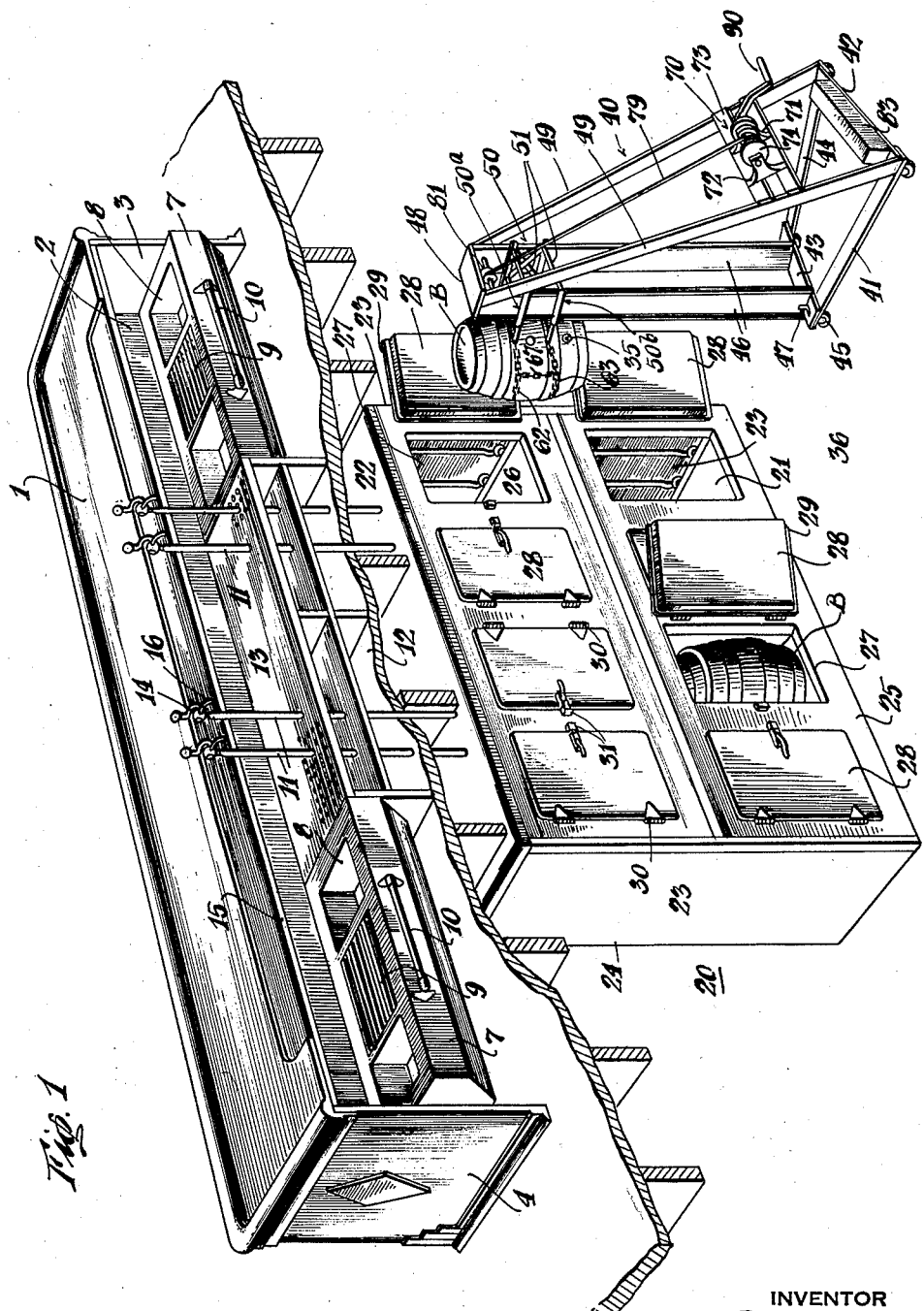

2,201,154

UNITED STATES PATENT OFFICE 2,201,154

BREW HANDLING AND DISPENSING APPARATUS

John M. Bruce, New York, N. Y.

Application November 8, 1937, Serial No. 173,309

6 Claims. (Cl. 212—140)

This invention relates to brew handling and dispensing apparatus, whereby brew may be handled and dispensed in the barroom premises quickly and efficiently in a sanitary and attractive manner with a minimum number of attendants required in the handling and dispensing of the brew from the brewers' barrels.

In accordance with this invention, an attractive and sanitary bar is provided which may be conveniently located in the barroom, the bar being provided with all the necessary facilities for the dispensing of the brew in a sanitary, efficient and economical manner. Such accessories may include conveniently located sinks for cleansing the brew glasses into which the brew is tapped for consumption by the customer. The brewers' barrels are contained in an attractive, sturdily constructed refrigerated cabinet located directly below the bar floor. The cabinet is preferably divided into upper and lower compartments, the upper compartment being for brew barrels from which brew is being drawn while the lower compartment is purely a storage space for additional brew-filled barrels. Draft apparatus extending from the bar, through the bar floor and through the upper wall of the cabinet beneath the bar, is provided. The dispensing apparatus is provided with means for direct detachable connection to the brewers' barrels located in the upper compartment of the cabinet. The brew dispensing apparatus is so constructed as to require relatively short draft tubes of low brew-containing capacity so that a relatively small percentage of the brew drawn into the consumer's glass is permitted to stand or remain in the dispensing apparatus. A minimum of agitation of the brew is thus obtained so that a creamy foam collar of relatively shallow depth is dispensed into the consumer's glass. The draft tubes, faucets, and taps are also so constructed as to permit the same to be easily and quickly removed from the bar and cabinet for periodic cleaning and sterilization thereof.

This invention further comprehends the provision of convenient means for removing and handling the brew barrels in the bar premises whereby the brew-filled barrels may be easily and quickly lifted into brew-dispensing position within the upper compartment of the cabinet. The empty barrels may also be removed from the upper compartment of the cabinet and carried to any desired location in the premises where it is desired to stack and store them.

An object of this invention is to provide an improved brew-dispensing installation for barrooms, restaurants and brew dispensaries, which is conveniently arranged to require a minimum number of attendants in the dispensing of the brew from the brewers' barrels and the handling of such barrels.

Another object of this invention is to provide an improved brew-dispensing installation which is attractive in appearance, lasting in construction, economical to manufacture and install and which permits the economical dispensation and merchandising of brew in the consumer's glass in a sanitary and attractive manner.

Another object of this invention is to provide brew barrel-handling apparatus whereby the brew barrels can be conveniently and quickly moved about the bar premises and moved into and out of the refrigerated compartments of the cabinet.

Another object of this invention is to provide an improved derrick especially adapted for the handling of brew barrels in the premises where the brew is either manufactured or dispensed.

Other objects of this invention will become apparent as the disclosure proceeds.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a perspective view of a brew dispensary including the bar positioned on the floor of the barroom connected by removable draft apparatus to the refrigerated brew barrel-containing chamber positioned beneath the barroom floor and above an additional refrigerated storage chamber, which forms the cabinet, this figure also showing a convenient movable lifting derrick for lifting and placing the brew barrel within the cabinet;

Fig. 2 is a side elevational view of the brew barrel-lifting apparatus, certain parts thereof being shown in section to more clearly illustrate the construction; and Fig. 3 is a horizontal cross-sectional view of the brew barrel-lifting apparatus, this view being taken on line 3—3 of Fig. 2.

Similar reference characters refer to similar parts throughout the several views of the drawings and specification.

My improved bar and brew dispensary comprises more particularly a convenient and well arranged bar which sets upon the barroom floor and beneath which floor a refrigerated brew barrel-containing cabinet is positioned. The brew barrels within the cabinet are provided with detachable substantially straight draft conduits which extend upwardly to the top wall of the cabinet, through the barroom floor and terminating in dispensing faucets conveniently arranged with respect to the bar table.

As shown in Fig. 1, the bar generally comprises a bar table 1, a front wall 2, and end walls 3 and 4. Beneath the bar table 1 may be positioned one or more conveniently arranged sinks 7 having wash basins 8 and a drain board 9 associated therewith. A convenient towel rack 10 may be secured to the front wall of each sink. Draft tubes 11 of any desired number (depending upon the barrel capacity of the upper refrigerated compartment of the cabinet) extend from the refrigerated cabinet 20 upwardly through the barroom floor 12 and through the drain board 13 positioned beneath the bar table 1, the draft tubes 11 terminating in suitable dispensing faucets 14 which preferably extend a convenient distance above the bar table 1 and are positioned adjacent to the rear edge 15 thereof. The spouts 16 of the faucets 14 are so arranged as to overhang the drain board 13 so that any spillage occurring during the filling of the brew glass will not be deposited upon the bar table 1.

The refrigerated cabinet beneath the bar floor may comprise a compact box structure of the desired size and shape, having insulated enclosing walls, such as the bottom wall 21, the top wall 22, the end walls 23, the rear wall 24 and the front wall 25. The brew barrels B may be arranged in the refrigerated cabinet in tiers. A partition-forming floor 26 divides the cabinet into convenient upper and lower compartments. The front wall 25 of the cabinet is provided with spaced door openings 27 each sufficiently large so as to admit the convenient entry and removal of a brew barrel therethrough, each door opening 27 being closed by a suitably insulated door 28 having a sealing flange 29 to retain the cold atmosphere within the cabinet. Each door 28 may be hinged to the front wall 25 of the cabinet upon suitable hinges 30, each door being held in closed position by means of a suitable latch 31.

The interior of the cabinet 20 is provided with suitable refrigerating means so that the interior thereof may be kept at a low temperature sufficient to cool the brew within the barrel and maintain the brew in the barrel within the desired temperature range. Suitable means, not shown, may be provided for reducing the heat-insulating effectiveness of the barrel walls, so as to permit a rapid heat transfer between the brew in the barrel and the cold atmosphere in the cabinet surrounding the barrel. The preferred means for cooling the brew in the barrel and maintaining the brew in the barrel at the desired temperature range is more fully described in my copending application Serial No. 174,761, filed November 16, 1937, now Patent No. 2,140,896, dated December 20, 1938, and need not be here further described. The brew-dispensing apparatus whereby the brew is drawn from the brewer's transportation barrel B to the dispensing faucet 14 has also been fully described in my copending application. Each draft tube 11 is connected to a conveniently located valve sleeve 35 positioned at the lower end of the barrel, suitable means being provided to permit rapid attachment and detachment of the draft tubes so as to permit the periodic removal of the brew-dispensing apparatus from the bar and cabinet so that thorough cleaning and sterilization thereof may be effected.

The draft tubes 11 may be connected to the brewer's barrels located in the upper compartment of the cabinet and supported upon the partition wall 26. The lower compartment of the cabinet serves as a convenient storage space for the barrels prior to use, in which compartment the brew in the barrels can be protected against any substantial rise in temperature. Since the lower chamber of the cabinet is positioned relatively close to the floor 36 of the premises, the brew barrels in the lower chamber can be inserted and removed without difficulty. When the brew barrels in the upper chamber of the cabinet are emptied, they are removed and replaced by a full barrel which may be removed from the lower chamber or compartment of the cabinet.

Convenient means are provided for lifting the brew filled barrels from the floor 36 and moving the brew barrels in a position for insertion into the upper compartment of the cabinet and for facilitating the insertion of the brew barrels therein. As shown in Figs. 1, 2 and 3 of the drawings, such means may comprise a movable derrick construction 40 comprising a supporting frame formed by the frame or rail members 41, 44, 42 and 43 secured together in rigid assembly, this frame being provided with easy rolling casters or wheels of sufficient size to permit the derrick 40 to be conveniently rolled around by an attendant. A pair of parallel upwardly extending stanchion members 46 of strong and rigid construction are secured at their lower ends as by suitable brackets 47 to the rail member 43 of the supporting frame. The upper end of the stanchion members 46 may be connected together by means of a suitable horizontally arranged member 48, the stanchion members 46 being further strengthened by a pair of brace members 49 connected to the upper end of the stanchion members 46 and to the rail 42 of the frame member.

A carriage 50 is constructed to be vertically lifted upwardly along and guided by the stanchion members 46, as illustrated in Figs. 1, 2 and 3 of the drawings. The carriage comprises a pair of spaced rectangular frame members 50a and 50b of similar construction, each frame member being formed from a pair of bars 51 and 52 extending between and exterior of the stanchion members 46. A bar 53 is connected to one of the adjacent ends of the bars 51 and 52 by means of suitable bolts 54 and the other adjacent ends of the bars 51 and 52 are likewise connected by a bar 55 secured to the bars 51 and 52 as by bolts 56. A roller 57 is rotatably mounted on each end of the bars 51 and 52 and operates in rolling contact with track portion 57a of the adjacent stanchion member 46. The rollers 57 serve to guide each of the frame members 50a and 50b in their vertical movement along the stanchion members 46. The pair of spaced frame members 50a and 50b forming the carriage 50 are held in spaced relationship by a pair of cross bars 58 and 59 secured to the bars 51 and 52. As shown more particularly in Figs. 2 and 3, cross bar 58 is connected to the frame bar 52 of frame member 50a and the frame bar 51 of frame member 50b. Likewise cross bar 59 is connected with the frame bar 51 of frame member 50a and the frame bar 52 of the frame member 50b. A pair of cross bars 58 and 59 are provided at each end of the carriage 50, so as to provide a rigid and sturdy carriage construction.

The carriage 50 is provided with a pair of spaced barrel-supporting brackets, one barrel-supporting bracket being secured to the frame bars 51 and 52 of the upper frame member 50a and the other barrel-supporting bracket being secured by the frame bars 51 and 52 of the lower frame member 50b. Each bracket comprises a pair of spaced laterally projecting arms 60 and 61 suitably secured to the frame bars 51 and 52, the spaced arms 60 and 61 being in turn connected by an arcuate shaped member 68 designed to abut against the rotund side wall of the barrel. The brew barrel B is embraced by a pair of spaced slings 62 and 63 which may be formed of suitable link chains. One end of the sling chain 62 is secured by means of a hook or eyelet 64 to the arms 61 of the barrel-supporting bracket. The other end of the sling chain 62 may be provided with a suitable ring 65 which may be hooked into engagement with a hook 66 provided on the other arm member 60. The sling chain 63 may be similarly secured to the respective arms 61 and 60 of the other bracket forming a part of the carriage. The sling chains 62 and 63 may also be connected by one or more link chains 67 for retaining the sling chains 62 and 63 in proper spaced position.

The carriage 50 may be raised and lowered by means of a convenient hand-operated winch 70, the winch comprising a pair of spaced end frames 71 and 72 suitably supported on horizontally extending bars 73 connected to the brace members 49. A winding drum 74 fixed to a shaft 75 journaled in the end frames 71 and 72 supports the winding drum 74 in fixed position. The shaft 75 of the winding drum may be provided with a gear 76 fixed to one end thereof which meshes with a screw gear 77 to which a convenient hand-operated handle 90 is attached. Screw gear 77 is conveniently journaled in a suitable supporting bracket 78 fixed to one of the end frames 71. A cable 79 has one end thereof suitably secured to the drum 74, and the other end thereof secured by means of a suitable coupling 80 to the arcuate frame 68 of one of the brackets forming a part of the carriage. The cable 79 is trained over a guide sheave 81 rotatably mounted upon a shaft 82 positioned at the upper end of and extending between the stanchion members 46.

It is now seen that by manipulating the winch handle 90, the carriage 50 may be rolled upwardly along the stanchion members 46 to the upper end thereof, the sling chains 62 and 63 having previously been connected to the brew barrel B to carry the brew barrel with it. To give stability to the derrick, a suitable weight 83 may be secured to the frame rail 42, so that the derrick will not topple over due to the weight of the brew barrel which it supports.

The derrick above described can be conveniently and easily pushed around the barroom premises by applying hand pressure thereto, the casters or rollers 45 being suitably constructed and journaled so as to roll easily. The brew barrel B, whatever its location in the premises, may be quickly encircled by the sling chains 62 and 63. The barrel will not slip or roll in the sling when the carriage is moved upwardly. It will be further noted that the derrick is so constructed that the top, bottom and sides of the barrel are free of any protruding obstructions so that the barrel can be completely inserted into the upper compartment of the cabinet by merely rolling the derrick into a position to effect such insertion. The barrel is positioned within the sling chains 62 and 63 in a normal upright dispensing position so that the brew barrel need not be manipulated or shifted after it has once been engaged by the sling chains 62 and 63 or positioned within the upper compartment of the cabinet. The brew barrel may be easily and conveniently lifted by a few turns of the crank handle 90 which operates the winch 70, the gear ratio between the gear 76 attached to the drum shaft 75 and the screw gear 77 being such as to require little force on the winch handle 90 to raise the brew-filled barrel. This gear ratio is such as to provide a positive locking of the carriage 50 in any position of its travel up or down the track portion 57a. This allows the operator to release the handle 90 of the winch 70 and devote his entire energy to the moving of the derrick into position.

In removing an empty barrel from the upper chamber of the cabinet, the sling chains 62 and 63 may be easily wrapped around the empty barrel within the cabinet and the barrel withdrawn by pulling the rolling derrick away from the cabinet. The rolling derrick can then be rolled to any location around the premises and the brew barrel deposited in any convenient location for storage. The rolling derrick is sturdy and strong in construction, occupies a small amount of floor space and is well balanced and stable so that it cannot be tipped over in normal use.

It is now seen that I have provided a conveniently arranged brew-dispensing installation admirably adapted for installation in stores, restaurants and bars for the convenient and sanitary dispensation of brew. A convenient and attractive bar is provided with all of the facilities for dispensing brew and washing and cleansing glasses or mugs into which the brew is delivered from the dispensing faucets. An attractive and highly serviceable refrigerated cabinet is conveniently arranged beneath the barroom floor for the refrigerated storage of brew barrels and for barrels in brew-dispensing position. Quickly detachable and removable straightline dispensing apparatus is provided for drawing the brew directly from the barrel placed in the upper chamber of the cabinet through the dispensing faucets in the barroom, requiring a minimum length of travel of the brew from the barrel to the dispensing faucet. The dispensing apparatus herein described permits brew to be drawn into the glass or mug with a creamy foam collar of the desired depth. The bar draft apparatus can be quickly detached from the barrel and removed from the barroom premises to a point where thorough cleaning and sterilization thereof may be effected. A thoroughly cleaned and sterilized draft apparatus is provided to replace the apparatus to be cleaned. My improved brew handling and dispensing installation permits the dispensing of brew in a highly sanitary and attractive manner with a minimum of confusion, with rapid and economical service to the customer, and with a minimum number of attendants for handling the brew barrels and dispensing the brew.

While certain novel features of the invention have been disclosed and are pointed out in the annexed claims, it will be understood that various omissions, substitutions and changes may be made by those skilled in the art without departing from the spirit of the invention.

What is claimed is:

1. Brew barrel-handling apparatus including, a movable supporting frame, a pair of vertically extending guide members supported upon said frame adjacent one end extremity thereof, a brew barrel-supporting carriage vertically movable along said guide members, manipulating means for raising and lowering said carriage, and means projecting laterally from said carriage and overhanging said frame for engaging the side wall of an upright brew barrel, said carriage including rollers connected thereto, certain of said rollers being vertically spaced from one another, and others of said rollers being laterally spaced from said first named rollers, said guide members exending between said laterally spaced rollers and providing oppositely facing bearing surfaces for said laterally spaced rollers respectively.

2. Brew barrel-handling apparatus including, a supporting frame, a carriage associated with said frame, means for elevating said carriage, a plurality of spaced, arcuate shaped members extending laterally from said carriage adapted to engage a side of the brew barrel, and sling means cooperating with said arcuate members and including a plurality of spaced, flexible elements embracing the barrel side wall for removably securing the barrel in upright position to said carriage.

3. Brew barrel hoisting apparatus including a movable base, a generally vertically extending guide frame mounted on said base, a carriage movable along said guide frame, said carriage having a barrel gripping device overhanging the edge of said base whereby the side wall of an upright barrel may be engaged by said gripping device while resting in upright position on a supporting surface independent of said hoisting apparatus, and means associated with said carriage for elevating and lowering said barrel while in generally upright position, said gripping device including an arcuate shaped member rigidly fixed to the carriage and overhanging the edge of said base, and a sling connected to said carriage and encircling the side wall of said barrel, said sling being so arranged as to be depressed by the weight of the barrel and thus hold the barrel firmly pressed against said arcuate shaped member and suspended in said sling.

4. Brew barrel hoisting apparatus including, a supporting frame, said frame being supported upon rollers whereby said frame may be rolled along a floor, a vertically extending guide frame mounted on said supporting frame along one side edge thereof, a counterbalacing weight at the opposite side edge of said supporting frame, a carriage movable vertically along said guide frame, means for vertically manipulating said carriage, an element rigidly fixed to said carriage and projecting laterally beyond said supporting frame adapted to engage the side wall of an upright barrel, and a flexible element encircling the side wall of said upright barrel below the point of maximum girth thereof and thereby securing said upright barrel to said element.

5. A barrel hoisting apparatus including a base, rollers supporting said base, a pair of spaced vertically extending guide members fixed to said base at one side edge thereof, a carriage movable along said guide members, said carriage including a pair of vertically spaced frames, strut elements connecting said frames, rollers carried by said frames movable along said vertically extending guide members, said carriage frames having an arcuate shaped element generally conforming to the curvature of a barrel side wall, spaced flexible elements connected to said carriage and adapted to encircle the barrel side wall with the top and bottom of the barrel free of said hoisting apparatus, means including a cable fixedly secured to said carriage for elevating and lowering said barrel while in generally upright position, and a counterweight supported on said base preventing overbalancing thereof during hoisting of the barrel.

6. Hoisting apparatus operative to lift and insert a barrel into an elevated compartment including a base mounted on rollers whereby said base may be moved adjacent to an upright barrel, means adapted to encircle the side wall of the upright barrel, and means for elevating said barrel encircling means to the elevation of said compartment whereupon said barrel may be inserted into said compartment by moving said base toward the compartment opening, said barrel elevating means including a pair of spaced vertically extending channel-shaped uprights fixed to one extreme side edge of said base and carriage comprising a frame having rollers movable along the exterior flange surfaces of said channel-shaped uprights, a hoist and cable for vertically manipulating said carriage, said barrel encircling means being connected to said carriage independently of said cable.

JOHN M. BRUCE.